(12) United States Patent
Yoon et al.

(10) Patent No.: US 12,011,046 B2
(45) Date of Patent: Jun. 18, 2024

(54) AEROSOL-GENERATING DEVICE INCLUDING DISPLAY

(71) Applicant: KT&G CORPORATION, Daejeon (KR)

(72) Inventors: Sung Wook Yoon, Gyeonggi-do (KR); Yong Hwan Kim, Gyeonggi-do (KR); Seung Won Lee, Gyeonggi-do (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 524 days.

(21) Appl. No.: 17/282,937

(22) PCT Filed: Sep. 28, 2020

(86) PCT No.: PCT/KR2020/013181
§ 371 (c)(1),
(2) Date: Apr. 5, 2021

(87) PCT Pub. No.: WO2021/066442
PCT Pub. Date: Apr. 8, 2021

(65) Prior Publication Data
US 2022/0256932 A1 Aug. 18, 2022

(30) Foreign Application Priority Data
Oct. 1, 2019 (KR) .................. 10-2019-0121742

(51) Int. Cl.
*A24F 47/00* (2020.01)
*A24F 40/51* (2020.01)
(Continued)

(52) U.S. Cl.
CPC .............. *A24F 40/60* (2020.01); *A24F 40/51* (2020.01); *A24F 40/53* (2020.01)

(58) Field of Classification Search
CPC .......... A24F 40/60; A24F 40/51; A24F 40/53; A24F 40/20; A24F 40/40; A24F 40/46;
(Continued)

(56) References Cited

U.S. PATENT DOCUMENTS 6,040,560 A 3/2000 Fleischhauer et al.
8,633,916 B2 1/2014 Bernstein et al.
(Continued)

FOREIGN PATENT DOCUMENTS

CN 103207672 A 7/2013
CN 103997921 A 8/2014
(Continued)

OTHER PUBLICATIONS

US 11,666,095 B2, 06/2023, Lee et al. (withdrawn)
(Continued)

*Primary Examiner* — Abdullah A Riyami
*Assistant Examiner* — Nelson R. Burgos-Guntin
(74) *Attorney, Agent, or Firm* — Sughrue Mion, PLLC

(57) ABSTRACT

An aerosol-generating device according to the present disclosure includes a display through which a user can easily grasp information about the state of the aerosol-generating device. The display of the aerosol-generating device outputs at least one indicator, and the user can obtain information of the aerosol-generating device linked with each indicator by touching the indicators output from the display.

14 Claims, 17 Drawing Sheets

(51) Int. Cl.
*A24F 40/53* (2020.01)
*A24F 40/60* (2020.01)

(58) Field of Classification Search
CPC ...... A24F 40/50; G06F 1/1637; G06F 1/1643; G06F 3/04144; G06F 3/04886; G06F 3/016; G06F 2203/04103; G06F 2203/04105; G06F 3/041; G08B 6/00
See application file for complete search history.

(56) References Cited

U.S. PATENT DOCUMENTS

| | | | |
|---|---|---|---|
| 9,971,435 B2 | 5/2018 | Kim et al. | |
| 10,091,839 B2* | 10/2018 | Murison | A24F 40/65 |
| 10,136,673 B2 | 11/2018 | Mironov | |
| 10,172,392 B2 | 1/2019 | Sur et al. | |
| 10,394,328 B2 | 8/2019 | Kang et al. | |
| 10,925,316 B2 | 2/2021 | Batista et al. | |
| 2011/0141052 A1 | 6/2011 | Bernstein et al. | |
| 2012/0068835 A1 | 3/2012 | Li | |
| 2013/0341218 A1 | 12/2013 | Liu | |
| 2014/0345606 A1 | 11/2014 | Talon | |
| 2014/0345633 A1 | 11/2014 | Talon et al. | |
| 2016/0011684 A1 | 1/2016 | Zhang | |
| 2016/0219933 A1 | 8/2016 | Henry, Jr. et al. | |
| 2016/0338407 A1 | 11/2016 | Kerdemelidis | |
| 2017/0042230 A1* | 2/2017 | Cameron | A24F 40/60 |
| 2017/0119053 A1* | 5/2017 | Henry, Jr. | A61M 15/00 |
| 2017/0181475 A1* | 6/2017 | Cameron | A24F 40/53 |
| 2017/0182267 A1* | 6/2017 | Cameron | A61M 11/042 |
| 2017/0196270 A1* | 7/2017 | Vick | H02J 7/0042 |
| 2017/0251724 A1 | 9/2017 | Lamb et al. | |
| 2017/0273358 A1* | 9/2017 | Batista | A24F 40/40 |
| 2017/0303590 A1* | 10/2017 | Cameron | A24F 40/00 |
| 2017/0303592 A1* | 10/2017 | Cameron | A24F 40/53 |
| 2017/0303593 A1* | 10/2017 | Cameron | A24F 40/60 |
| 2017/0311647 A1 | 11/2017 | Batista et al. | |
| 2017/0332702 A1* | 11/2017 | Cameron | A24F 40/65 |
| 2018/0020732 A1 | 1/2018 | Kozlowski et al. | |
| 2018/0043114 A1* | 2/2018 | Bowen | A61M 15/003 |
| 2018/0132526 A1* | 5/2018 | Davis | H05B 1/0244 |
| 2018/0140008 A1 | 5/2018 | Sur et al. | |
| 2018/0153219 A1 | 6/2018 | Verleur et al. | |
| 2018/0188849 A1 | 7/2018 | Ko et al. | |
| 2019/0004630 A1 | 1/2019 | Han et al. | |
| 2019/0110520 A1 | 4/2019 | Bilat | |
| 2020/0006950 A1 | 1/2020 | Holzherr | |
| 2020/0163380 A1 | 5/2020 | Lee et al. | |
| 2020/0214355 A1 | 7/2020 | Lee et al. | |
| 2020/0214356 A1 | 7/2020 | Worm et al. | |
| 2020/0305508 A1 | 10/2020 | Talon | |
| 2020/0359695 A1 | 11/2020 | Lim | |
| 2021/0170116 A1 | 6/2021 | Saleem | |

FOREIGN PATENT DOCUMENTS

| | | |
|---|---|---|
| CN | 107438372 A | 12/2017 |
| CN | 108255336 A | 7/2018 |
| CN | 108369468 A | 8/2018 |
| CN | 110177476 A | 8/2019 |
| JP | 2001-502542 A | 2/2001 |
| JP | 2013-513865 A | 4/2013 |
| KR | 10-2014-0121381 A | 10/2014 |
| KR | 10-2015-0119425 A | 10/2015 |
| KR | 10-2016-0127086 A | 11/2016 |
| KR | 10-2016-0140608 A | 12/2016 |
| KR | 10-2016-0147253 A | 12/2016 |
| KR | 10-2017-0102856 A | 9/2017 |
| KR | 10-2018-0043617 A | 4/2018 |
| KR | 10-2018-0118201 A | 10/2018 |
| KR | 10-2018-0129676 A | 12/2018 |
| RU | 2018129904 A | 10/2018 |
| RU | 2700021 C2 | 9/2019 |
| WO | 2016/009202 A1 | 1/2016 |
| WO | 2018/080115 A1 | 5/2018 |
| WO | 2018/190603 A1 | 10/2018 |
| WO | 2019/030360 A1 | 2/2019 |
| WO | 2019/069176 A1 | 4/2019 |
| WO | 2019/088559 A2 | 5/2019 |
| WO | 2019/088605 A2 | 5/2019 |

OTHER PUBLICATIONS

Office Action issued from Korean Patent Application No. 10-2019-0121742 dated Jan. 19, 2021.
International Search Report for PCT/KR2020/013181 dated Feb. 3, 2021 (PCT/ISA/210).
Written Opinion for PCT/KR2020/013181 dated Feb. 3, 2021 (PCT/ISA/237).
Office Action dated Apr. 6, 2023 from the Chinese Patent Office in Application No. 202080039334.3.
Office Action dated Jun. 19, 2023 from the Ukrainian Patent Office in Application No. a 2021 02265.
Russian Office Action dated Oct. 3, 2022 in Russian Application No. 2021113460/03.
Japanese Office Action dated Nov. 8, 2022 in Japanese Application No. 2021-569229.
Extended European Search Report dated Feb. 17, 2022 from the European Patent Office in EP Application No. 20870437.9.
Chinese Office Action dated Sep. 28, 2023 in Chinese Application No. 202080039334.3.
Korean Office Action dated Nov. 22, 2023 in Korean Application No. 10-2023-0012076.
Chinese Office Action dated Dec. 28, 2023 in Application No. 202080039334.3.

* cited by examiner

AEROSOL-GENERATING DEVICE INCLUDING DISPLAY

CROSS REFERENCE TO RELATED APPLICATIONS

This application is a National Stage of International Application No. PCT/KR2020/013181 filed Sep. 28, 2020, claiming priority based on Korean Patent Application No. 10-2019-0121742 filed Oct. 1, 2019.

TECHNICAL FIELD

Embodiments relate to an aerosol-generating device, and more particularly, to an aerosol-generating device including a display outputting at least one indicator of the aerosol-generating device.

BACKGROUND ART

Recently, demand for an alternative to traditional cigarettes has been increased. For example, there is growing demand for an aerosol generating device that generates aerosols by heating an aerosol-generating material in cigarettes or cartridges rather than by combusting cigarettes. Accordingly, research into heating-type cigarettes and heating-type cartridges has been actively conducted.

DISCLOSURE OF INVENTION

Technical Problem

When a user operates an aerosol-generating device, it is necessary to grasp information about the current state of the aerosol-generating device. The state of the aerosol-generating device may include, for example, a rest mode, a heating mode, a cleaning mode, etc., and may be changed by the user as necessary.

In the related art, there is a lack of components for intuitively displaying the state of an aerosol-generating device, and therefore, it has been difficult for a user to grasp the current state of an aerosol-generating device.

Accordingly, an aerosol-generating device needs to include components that intuitively display the state of the aerosol-generating device so that the user can easily grasp information about the state of the aerosol-generating device.

Solution to Problem

An embodiment is to provide an aerosol-generating device including a display outputting at least one indicator of the aerosol-generating device.

The technical problems to be solved by the present embodiments are not limited to the technical problems as described above, and other technical problems may be derived from the following embodiments.

Advantageous Effects of Invention

An aerosol-generating device according to an embodiment includes a display through which a user can easily grasp information about the state of the aerosol-generating device. The display of the aerosol-generating device may output at least one indicator. The user may obtain information of an aerosol-generating device linked with each of the at least one indicator by touching the indicator output by the display.

The user may intuitively grasp the information of the aerosol-generating device through the at least one indicator and easily change operating modes of the aerosol-generating device based on the information.

In addition, the display of the aerosol-generating device according to an embodiment may classify a user's touch according to pressure. The aerosol-generating device may operate differently based on to the type of a touch classified according to the pressure of the users touch, thereby increasing the ease of use of the aerosol-generating device.

In addition, according to an embodiment, the display of the aerosol-generating device generates a feedback signal according to the user's touch, and a processor may control the aerosol-generating device to transfer feedback corresponding to the feedback signal to the user. The feedback corresponding to the feedback signal may enable recognition and identification of each touch when the user touches the aerosol-generating device. Accordingly, the user can use the aerosol-generating device more efficiently.

BEST MODE FOR CARRYING OUT THE INVENTION

Figure 1A:
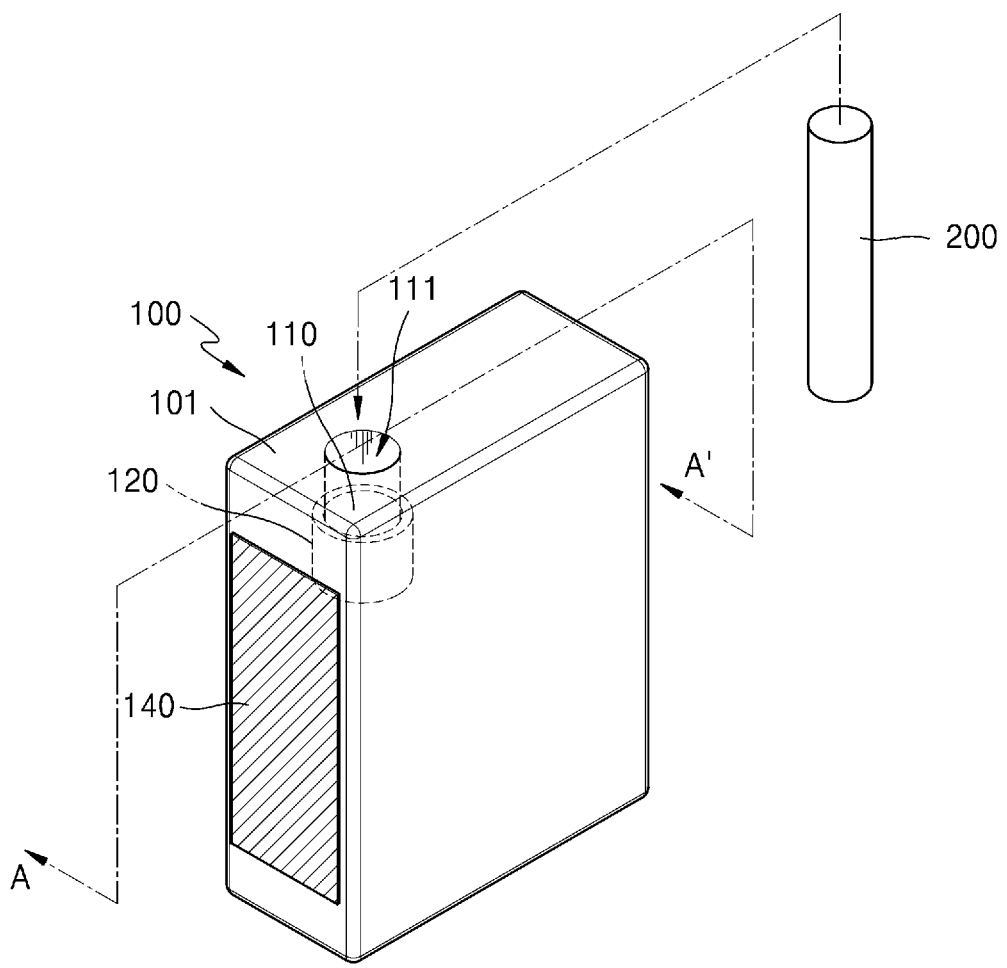
FIG. 1A is a perspective view showing an aerosol-generating device and an aerosol-generating article according to an embodiment.

Provided is an aerosol-generating device including: a housing; an accommodating portion accommodating an aerosol-generating article through an opening formed on one side of the housing; a sensor surrounding at least a portion of the accommodating portion and sensing physical properties of the aerosol-generating article; a display arranged on one surface of the housing; and a processor controlling operations of the sensor and the display, wherein the processor: detects whether the aerosol-generating article is accommodated in the accommodating portion based on the physical properties of the aerosol-generating article sensed by the sensor, and changes a state of the display from an off-state to an on-state.

The processor may control the display to output an indicator indicating an insertion of the aerosol-generating article when the aerosol-generating article is accommodated in the accommodating portion.

The processor may control the display to output an indicator indicating a temperature or humidity outside the aerosol-generating device.

The processor may recognize specifications of the aerosol-generating article based on the physical properties of the aerosol-generating article sensed by the sensor and control the display to output an indicator indicating the recognized specifications of the aerosol-generating article.

The display may include: a cover glass to be touched by a user; a panel outputting at least one indicator of the aerosol-generating device and detecting the user's touch; and a metal shield on which a feedback circuit generating a feedback signal in response to the user's touch is arranged, wherein the processor may control the aerosol-generating device to perform at least one of operations of emitting light, outputting audio, vibrating, and outputting a certain indicator on the display, according to the feedback signal.

The metal shield may include at least one taptic motor that generates tactile feedback, and the aerosol-generating device may vibrate according to the tactile feedback.

The display may further include a pressure sensor unit in which a plurality of pressure sensors for measuring an intensity of the user's touch are arranged.

The pressure sensor unit may measure the intensity of the user's touch to classify the users touch according to the intensity of the users touch, and the processor may control the aerosol-generating device to perform different operations according to the classified users touch.

An aerosol-generating device according to embodiments may include: an accommodating portion accommodating an aerosol-generating article through an opening formed on one side of a housing; a heater heating the aerosol-generating article by transferring heat to the accommodating portion; a battery transferring power to the heater; a display located on one surface of the housing and outputting at least one indicator of the aerosol-generating device; and a processor controlling operations of the heater, the battery, and the display, wherein the display includes: a cover glass to be touched by a user; a panel outputting at least one indicator of the aerosol-generating device and detecting the user's touch; and a metal shield on which a feedback circuit that generates a feedback signal in response to the user's touch is arranged.

When a certain indicator from among the at least one indicator is touched, the display may transmit an operation signal linked with the certain indicator to the processor, and the processor may control the aerosol-generating device to perform an operation corresponding to the operation signal.

The processor may control the aerosol-generating device to perform at least one of operations of emitting light, outputting audio, vibrating, and outputting a certain indicator on the display, according to the feedback signal.

The metal shield may include at least one taptic motor that generates tactile feedback, and the aerosol-generating device may vibrate according to the tactile feedback.

The display may further include a pressure sensor unit in which a plurality of pressure sensors for measuring an intensity of a user's touch are arranged.

The pressure sensor unit may measure the intensity of the user's touch to classify the user's touch according to the intensity of the user's touch, and the processor may control the aerosol-generating device to perform different operations according to the classified users touch.

The display may be arranged to fully cover the one surface of the housing.

The housing may include first opposite side surfaces and second opposite side surfaces, and the display may be located on at least one of the first opposite side surfaces.

Each of the first opposite side surfaces may be smaller than each of the second opposite side surfaces.

An aerosol-generating device according to embodiments may further include at least one force touch sensor that detects the user's grip and transmits an operation signal to the processor when the user grips the aerosol-generating device.

The at least one force touch sensor may include a pair of force touch sensors arranged on opposite side surfaces of the housing, respectively.

An aerosol-generating device according to embodiments may include: an accommodating portion accommodating an aerosol-generating article through an opening formed on one side of a housing; a heater heating the aerosol-generating article by transferring heat to the accommodating portion; a battery transferring power to the heater, a display located on one surface of the housing and outputting at least one indicator of the aerosol-generating device; and a processor controlling operations of the heater, the battery, and the display.

MODE FOR THE INVENTION

With respect to the terms used to describe the present embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used may be selected. In such a case, the meaning of the term will be described in detail at the corresponding portion in the description of the present embodiments. Therefore, the terms used in the various embodiments should be defined based on the meanings of the terms and the descriptions provided herein.

In addition, unless explicitly described to the contrary, the word "comprise" (or "include") and variations such as "comprises" (or "includes") or "comprising" (or "including") will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c." should be understood as including only a, only b, only c, both a and b, both a and c, both b and c, or all of a, b, and c.

It will be understood that when an element or layer is referred to as being "over," "above," "on." "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Meanwhile, terms used in the present specification are for describing embodiments and are not intended to limit the embodiments. In the present specification, the singular form also includes the plural form unless otherwise specified in the phrase.

Throughout the specification, a "longitudinal direction" of a component may be one direction in which the component extends, and in this case, the component extends longer in the one direction than in the other direction across the one direction.

Hereinafter, the present disclosure will now be described more fully with reference to the accompanying drawings, in which exemplary embodiments of the present disclosure are shown such that one of ordinary skill in the art may easily implement the present disclosure. The disclosure may, however, be embodied in many different forms and should not be construed as being limited to the embodiments set forth herein.

FIG. 1A is a perspective view of an aerosol-generating device 100 and an aerosol-generating article 200 according to an embodiment.

The aerosol-generating device 100 according to an embodiment includes an accommodating portion 110 accommodating the aerosol-generating article 200 through an opening 111 formed on one side of a housing 101, a heater 120 heating the aerosol-generating article 200 by transferring the heat to the accommodating portion 110, and a display 140 located on one surface of the housing 101 and outputting at least one indicator 1400 (see FIG. 2) of the aerosol-generating device 100.

The housing 101 of the aerosol-generating device 100 according to an embodiment may form the outer surface of the aerosol-generating device 100, and on one side of the housing 101, the opening 111 for accommodating the aerosol-generating article 200 into the accommodating portion 110 may be formed. The aerosol-generating article 200 may be inserted into the accommodating portion 110 through the opening 111. A cavity may be formed inside the accommodating portion 110 to accommodate the aerosol-generating article 200.

The accommodating portion 110 may have a shape and size corresponding to the aerosol-generating article 200 to accommodate the aerosol-generating article 200. For example, when the aerosol-generating article 200 has a cylindrical shape, the accommodating portion 110 may also have a cylindrical shaped cavity to accommodate the aerosol-generating article 200. However, the shapes of the aerosol-generating article 200 and the accommodating portion 110 are not limited thereto and may be changed as necessary.

The aerosol-generating device 100 according to an embodiment may include the heater 120 heating the aerosol-generating article 200. The heater 120 may be arranged near the accommodating portion 110. Heat from the heater 120 may be transferred to the accommodating portion 110 to heat the aerosol-generating article 200. The aerosol-generating article 200 may be heated through the heater 120 to generate an aerosol, and then the generated aerosol may be inhaled by a user.

The heater 120 of the aerosol-generating device 100 may be, for example, an electric resistive heater 120. The heater 120 may include an electrically conductive track, and the heater 120 may be heated as current flows through the electrically conductive track. However, the heater 120 is not limited to the above described example, and any other heaters capable of being heated to a desired temperature may be used. Here, the desired temperature may be preset in the aerosol-generating device 100 or manually set by the user.

As another example, the heater 120 may be an induction heating type. Specifically, the heater 120 may include an electrically conductive coil for heating the aerosol-generating article 200 by an induction heating method, and the aerosol-generating article 200 may include a susceptor capable of being heated by the heater 120 of the induction heating type.

The heater 120 may include at least one of a tube-type heating element, a plate-type heating element, a needle-type heating element, and a rod-type heating element, and may heat the inside or the outside of the aerosol-generating article 200 according to a shape of a heating element.

Figure 1B:
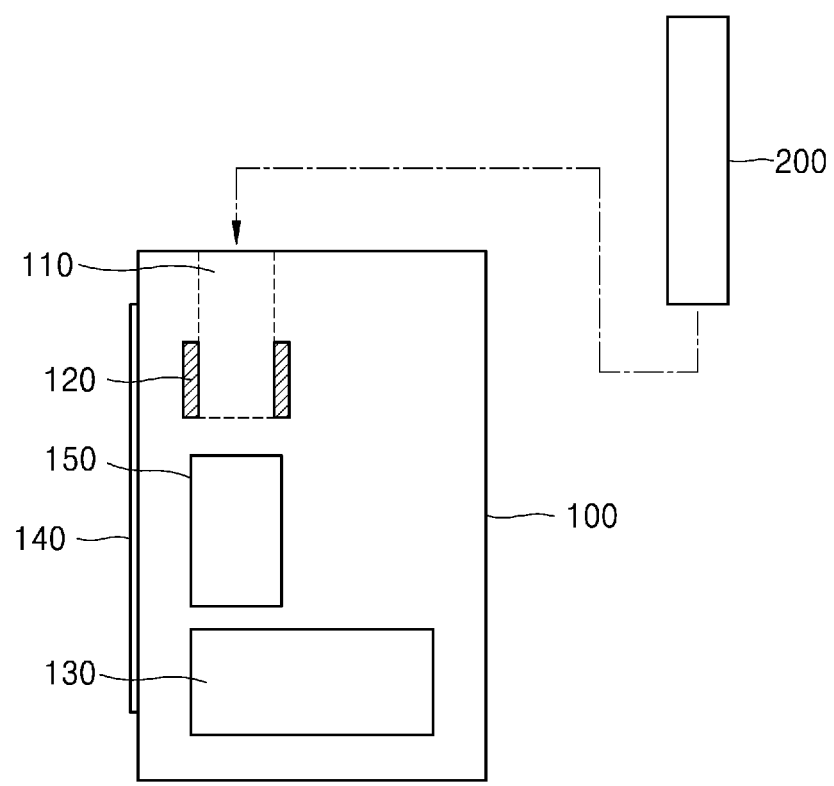
FIG. 1B is a cross-sectional view taken along line A-A' in the view of the aerosol-generating device according to the embodiment shown in FIG. 1A.

FIG. 1B is a cross-sectional view taken along line A-A' of the aerosol-generating device 100 according to the embodiment shown in FIG. 1A. FIG. 1B is a view for explaining in detail the internal components of the aerosol-generating device 100.

The aerosol-generating device 100 according to an embodiment may include a battery 130 that transfers power to the heater 120. The battery 130 may supply power for operating the aerosol-generating device 100 to components of the aerosol-generating device 100. For example, the battery 130 may supply power so that the heater 120 can be heated. In addition, the battery 130 may supply power required for operating the display 140, a sensor, and the like, which may be installed in the aerosol-generating device 100.

According to an embodiment, the aerosol-generating device 100 may include the display 140 located on one surface of housing 101 and outputting at least one indicator 1400 (see FIG. 2) of aerosol-generating device 100, and a processor 150 that controls operations of the heater 120, the battery 130, and display 140.

The processor 150 may control the overall operation of the aerosol-generating device 100. For example, the processor 150 may be electrically connected to the heater 120, the battery 130, and the display 140 to control the operations thereof, and may also control operation of other components of the aerosol-generating device 1N). In addition, the processor 150 may check the state of each of the components of the aerosol-generating device 100 to determine whether the aerosol-generating device 100 is in an operable state.

The processor 150 may be implemented as an array of multiple logic gates. The processor 150 may be implemented as a combination of a general-purpose microprocessor and a memory in which programs that can be executed on the microprocessor are stored. In addition, those skilled in the art to which the present embodiment belongs can apparently understand that the processor 150 is not limited thereto and may be implemented as other types of hardware.

In the present specification, for components having the same reference numerals as those shown in FIGS. 1A and 1B, corresponding descriptions referring to FIGS. 1A and 1B may be similarly applied.

Figure 2:
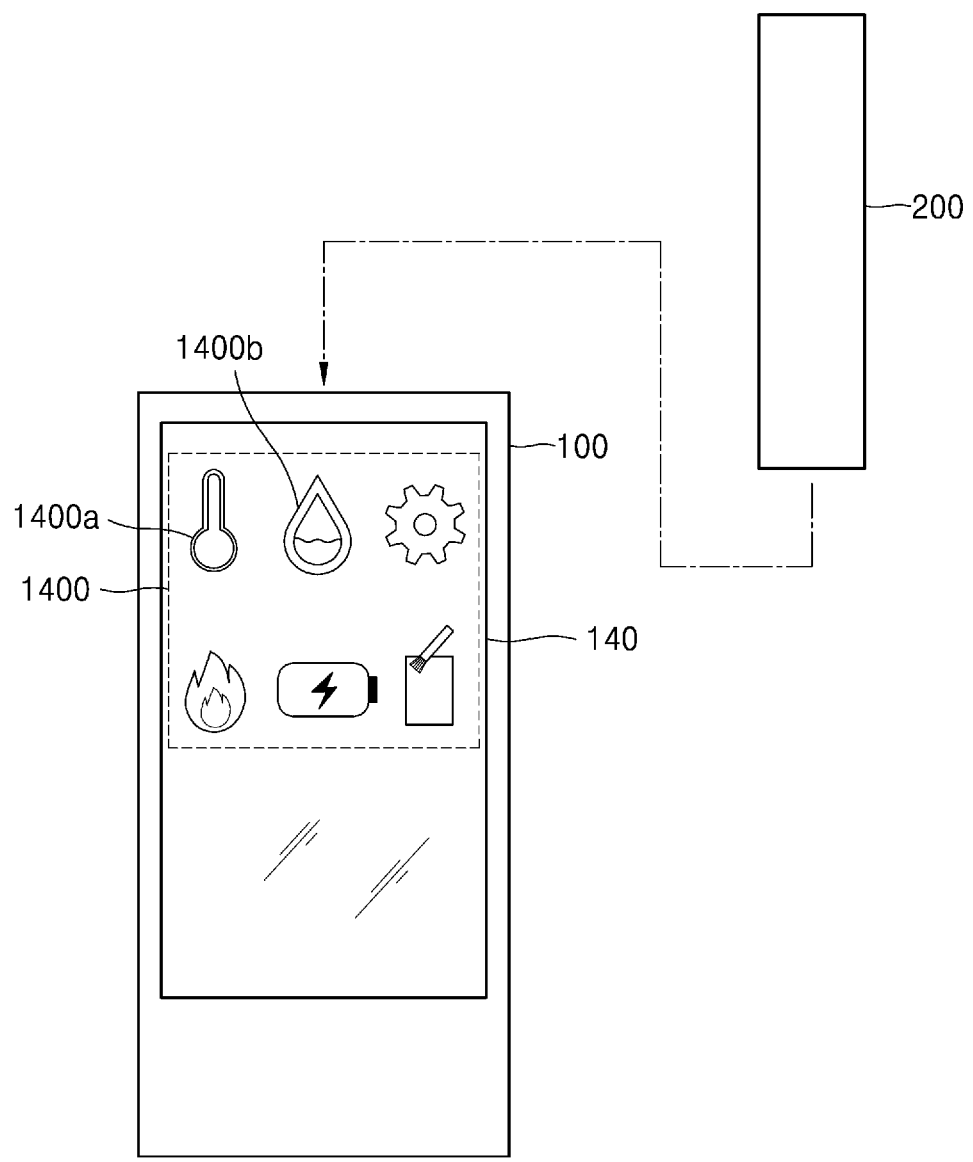
FIG. 2 is a front view of the display of the aerosol-generating device according to the embodiment shown in FIG. 1A.

FIG. 2 is a front view of the display 140 of the aerosol-generating device 100 according to the embodiment shown in FIG. 1A. FIG. 2 is a diagram for explaining in detail the display 140 and the at least one indicator 1400 output by the display 140 of the aerosol-generating device 1N).

The display 140 of the aerosol-generating device 100 according to an embodiment may be located on one surface of the housing 101 of the aerosol-generating device 100 and exposed to the user. The display 140 may form an outer surface of the aerosol-generating device 100 together with the housing 101.

In this case, the at least one indicator 1400 output by the display 140 may include a command or interface used to input data or control operation of a system or program.

The at least one indicator 1400 of the aerosol-generating device 100 may be linked to information and a certain operation of the aerosol-generating device 100. The user may control or operate the aerosol-generating device 100 by touching the at least one indicator 1400 of the display 140 and obtain information about the aerosol-generating device 100.

The at least one indicator 1400 of the aerosol-generating device 100 may have various shapes, through which the user can intuitively obtain information.

As an example, the at least one indicator 1400 may include indicators 1400a and 1400b indicating the temperature and humidity outside the aerosol-generating device 100, respectively. In this case, the indicator 1400a indicating the temperature outside the aerosol-generating device 100 may be displayed in the shape of a thermometer, and the indicator 1400b indicating the humidity outside the aerosol-generating device 100 may be displayed in the shape of a water drop. The shape, size, arrangement, etc. of the at least one indicator 1400 are not limited to the drawings and may be changed as necessary. The indicator 1400 may directly indicate information regarding the aerosol-generating device 100 (e.g., ambient temperature and/or humidity). Also, the indicator 1400 may be a selectable icon, and information corresponding to the icon may be obtained and displayed when a user makes a touch input on the icon.

Figure 3:
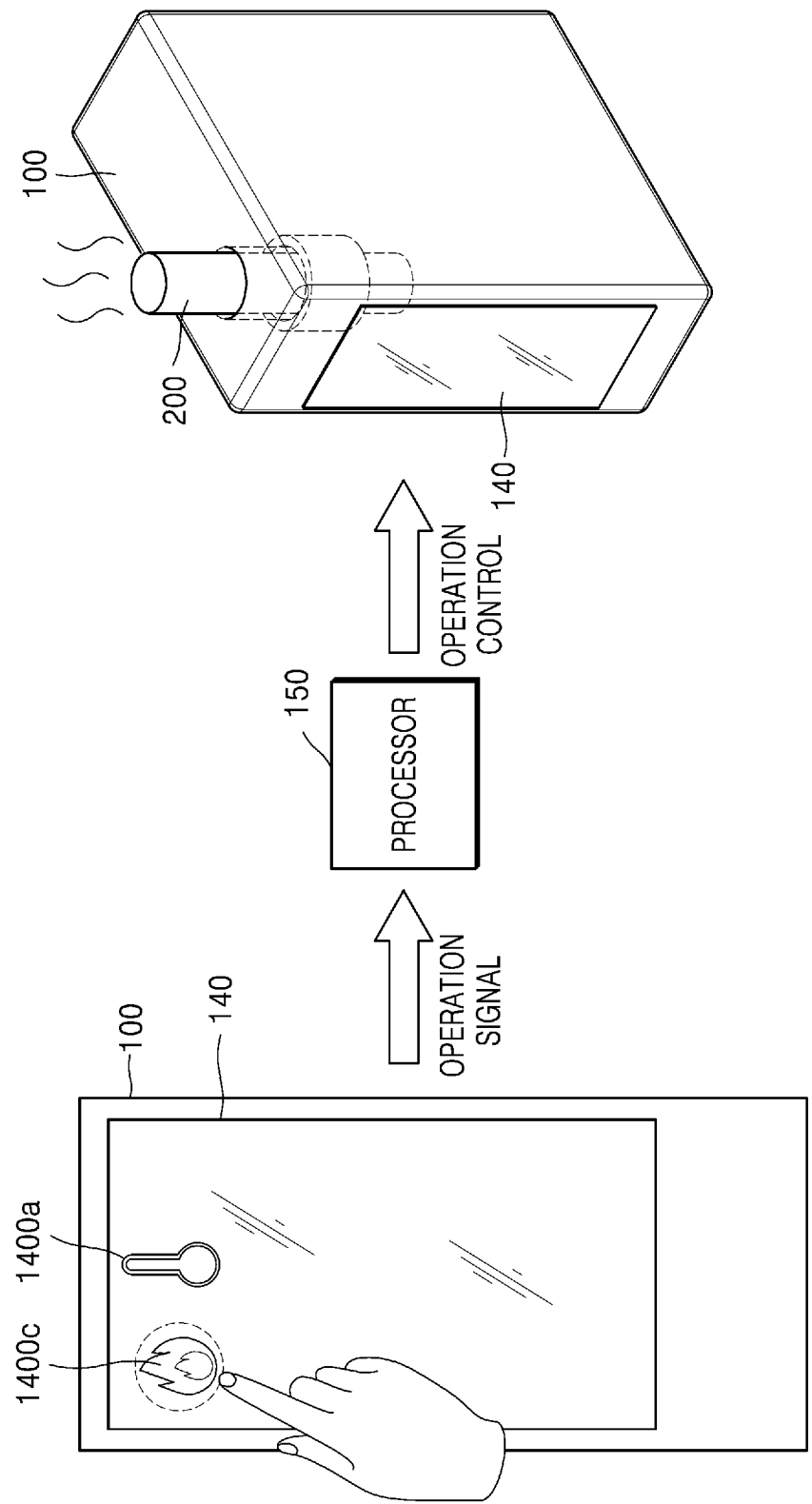
FIG. 3 is a diagram schematically illustrating operation of the aerosol-generating device according to the touch of an indicator of the display of the aerosol-generating device according to an embodiment.

FIG. 3 is a diagram schematically illustrating operation of the aerosol-generating device 100 according to a touch on the indicator 1400 of the display 140 of the aerosol-generating device 100 according to an embodiment.

When certain indicators 1400a and 1400c among the at least one indicator 1400 are touched on the display 140 of the aerosol-generating device 100 according to an embodiment, the display 140 may transmit an operation signal corresponding to the indicators 1400a and 1400c to the processor 150, and the processor 150 may control the aerosol-generating device 100 to perform an operation corresponding to the operation signal.

That is, the user may control the aerosol-generating device 100 to perform certain operations by touching an indicator among the at least one indicator 1400 output through the display 140.

As an example, the indicator 1400c output on the display 140 may be linked with an operation signal for performing an operation of heating the heater 120. When the user touches the indicator 1400c output on the display 140, the operation signal for performing the operation of heating the heater 120 may be transmitted to the processor 150, and the processor 150 may control each component of the aerosol-generating device 100 based on the operation signal. Accordingly, heating of the heater 120, which is the operation corresponding to the operation signal of the indicator 1400a, may be performed.

As another example, another indicator 1400a output on the display 140 may be linked with an operation signal for measuring the temperature around the aerosol-generating device 100 and displaying the temperature on the display 140. When the user touches another output indicator 1400a, an operation signal for measuring the temperature and outputting the temperature to the display 140 may be transmitted to the processor 150, and the processor 150 may control each component of the aerosol-generating device 100 based on the operation signal. Accordingly, an operation of measuring the ambient temperature and outputting the temperature on the display 140, which is an operation corresponding to the operation signal from the indicator 1400a, may be performed.

Figure 4A:
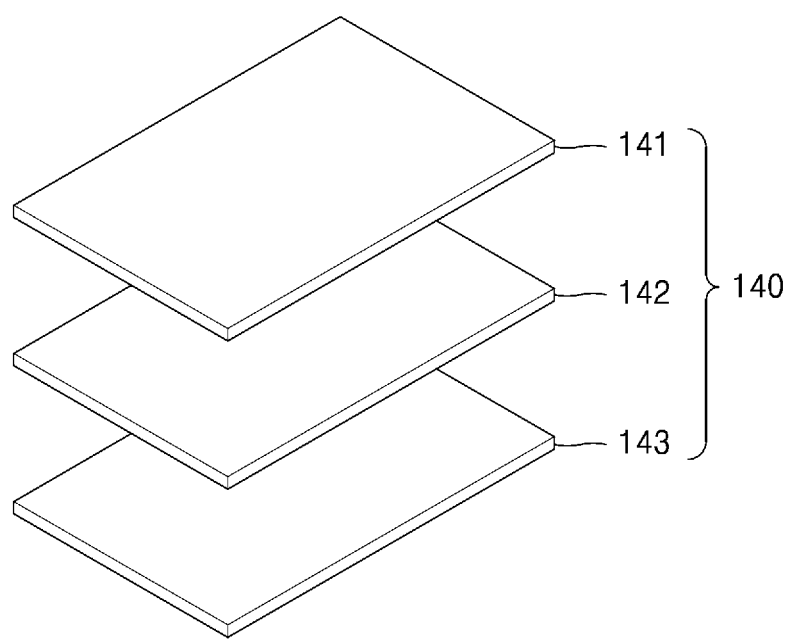
FIG. 4A is a diagram showing an example of a stacked structure of a display of an aerosol-generating device according to an embodiment.

FIG. 4A is a diagram showing an example of a stacked structure of the display 140 of the aerosol-generating device 100 according to an embodiment. An example stacked structure of the display 140 will be described in more detail with reference to FIG. 4A.

The display 140 of the aerosol-generating device 100 according to an embodiment includes a cover glass 141, a panel 142, and a metal shield 143. The cover glass 141 may form the exterior of the aerosol-generating device 100 together with the housing 101. The cover glass 141 may be touched by the user, and may protect the panel 142 and the metal shield 143 from the external impact.

The panel 142 of the display 140 of the aerosol-generating device 100 according to an embodiment may be located on the inner side of the cover glass 141.

Examples of the panel 142 may include, but are not limited to, a liquid crystal display (LCD) panel, a light emitting diode (LED) display panel, an organic light emitting diode (OLED) display panel, a micro-electro mechanical system (MEMS) display panel, and an electronic paper display panel.

The panel 142 may include a touch sensor or a touch panel, which may be integrally formed with the display panel. As the panel 142 includes a touch sensor or a touch panel, the panel 142 may detect a user's touch.

The metal shield 143 of the display 140 of the aerosol-generating device 100 according to an embodiment may be located on the inner side of the panel 142. In this case, the cover glass 141, the panel 142 and the metal shield 143 may be sequentially disposed and stacked.

A feedback circuit for generating a feedback signal in response to the user's touch may be arranged on the metal shield 143.

For example, when a user touches the cover glass 141 of the display 140, the panel 142 may recognize the user's touch, and the metal shield 143 may generate a feedback signal.

According to the feedback signal generated by the metal shield 143 of the display 140, the processor 150 may control the aerosol-generating device 100 to perform at least one of operations of emitting light, outputting audio, vibrating, and outputting a certain indicator 1400 on the display 140.

As an example, when a user touches an indicator displayed on the display 140, the display 140 may output another indicator as feedback on the user's touch. In this case, another indicator may be output to confirm the user's touch input. The shape, size, arrangement, etc. of the indicators are design parameters and may be changed as necessary.

Figure 4B:
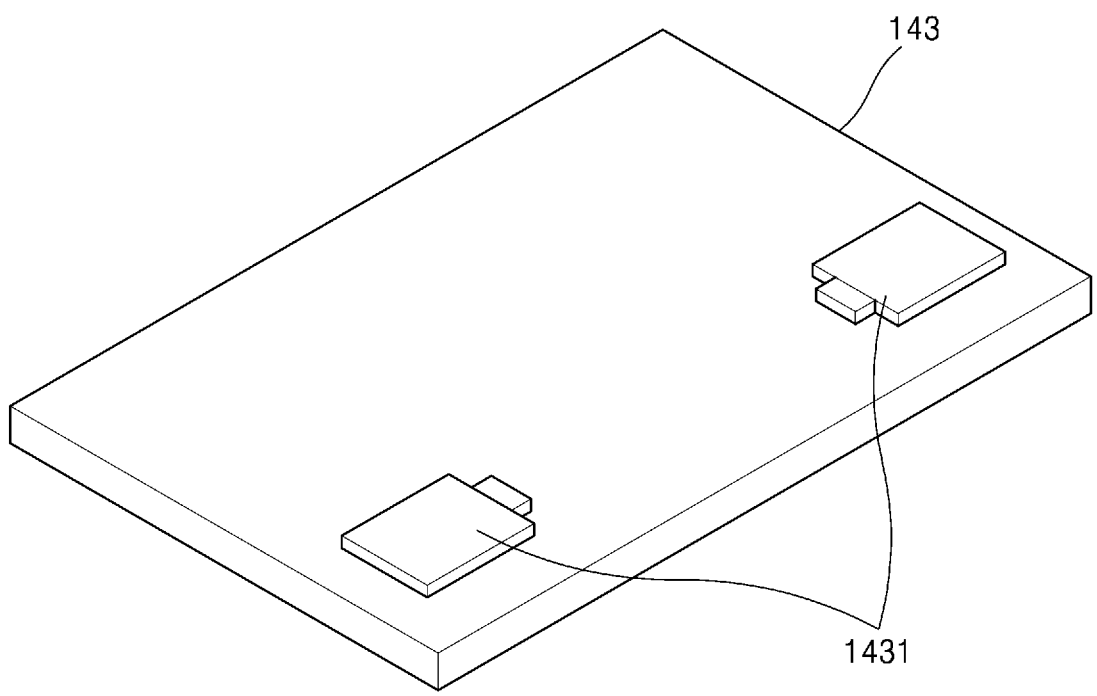
FIG. 4B is a diagram showing a shape of a metal shield of a display of an aerosol-generating device according to an embodiment.

FIG. 4B is a diagram showing a shape of a metal shield 143 of the display 140 of the aerosol-generating device 100 according to an embodiment.

The metal shield 143 of the display 140 of the aerosol-generating device 100 according to an embodiment includes at least one taptic motor 1431 generating tactile feedback. As such, the aerosol-generating device 100 may vibrate according to the feedback.

For example, as shown in FIG. 4B, the metal shield 143 of the display 140 may include a plurality of taptic motors which are spaced apart from each other. The aerosol-generating device 100 may vibrate according to the tactile feedback generated by the at least one taptic motor 1431.

Figure 5:
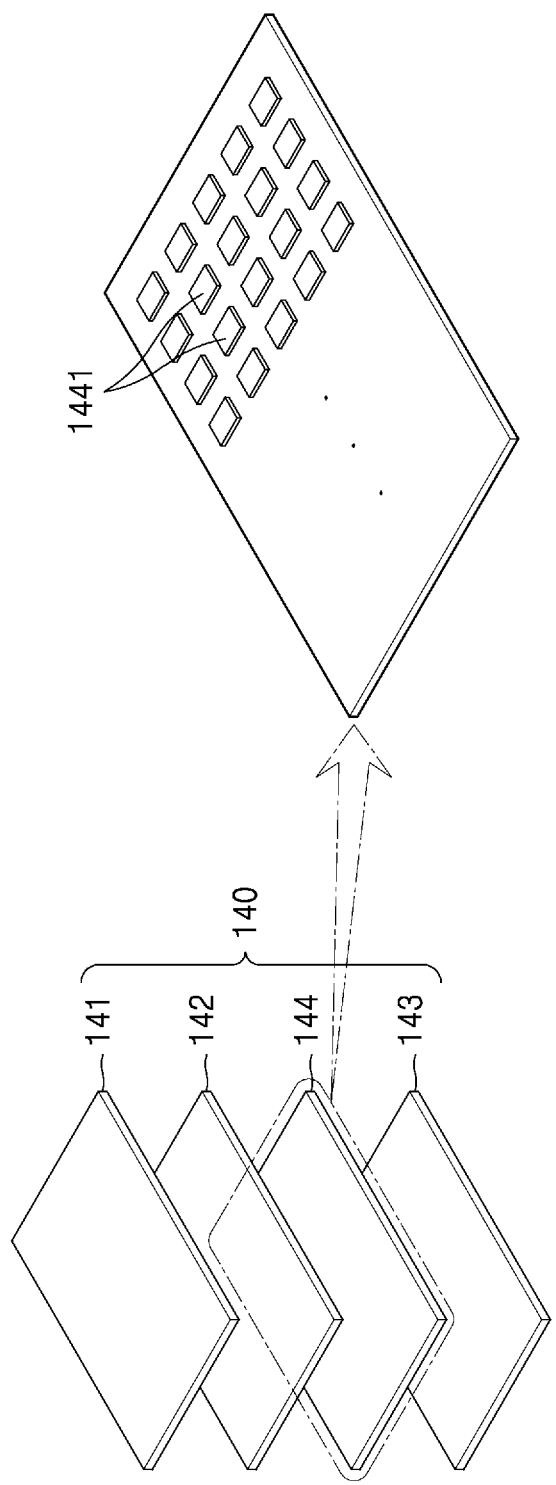
FIG. 5 is a diagram showing another example of a stacked structure of a display of an aerosol-generating device according to an embodiment.

FIG. 5 is a diagram showing another example of a stacked structure of the display 140 of the aerosol-generating device 100 according to an embodiment. Another example stacked structure of the display 140 will be described in more detail with reference to FIG. 5.

The display 140 of the aerosol-generating device 100 according to an embodiment may further include a pressure sensor unit 144 in which a plurality of pressure sensors 1441 each of which measures intensity of the user's touch are arranged.

For example, the pressure sensor unit 144 may be arranged between the panel 142 and the metal shield 143. The pressure sensor unit 144 may measure the intensity (i.e., pressure) of the user's touch to classify the user's touch according to the intensity of the user's touch. The processor 150 may control the aerosol-generating device 100 to perform different operations according to the classified user's touch.

As shown in FIG. 5, the pressure sensor unit 144 may include a plurality of pressure sensors 1441 spaced apart from each other and arranged side by side.

The pressure sensor unit 144 that classifies the user's touch according to an intensity of the users touch will be described in more detail below with reference to FIG. 6.

Figure 6:
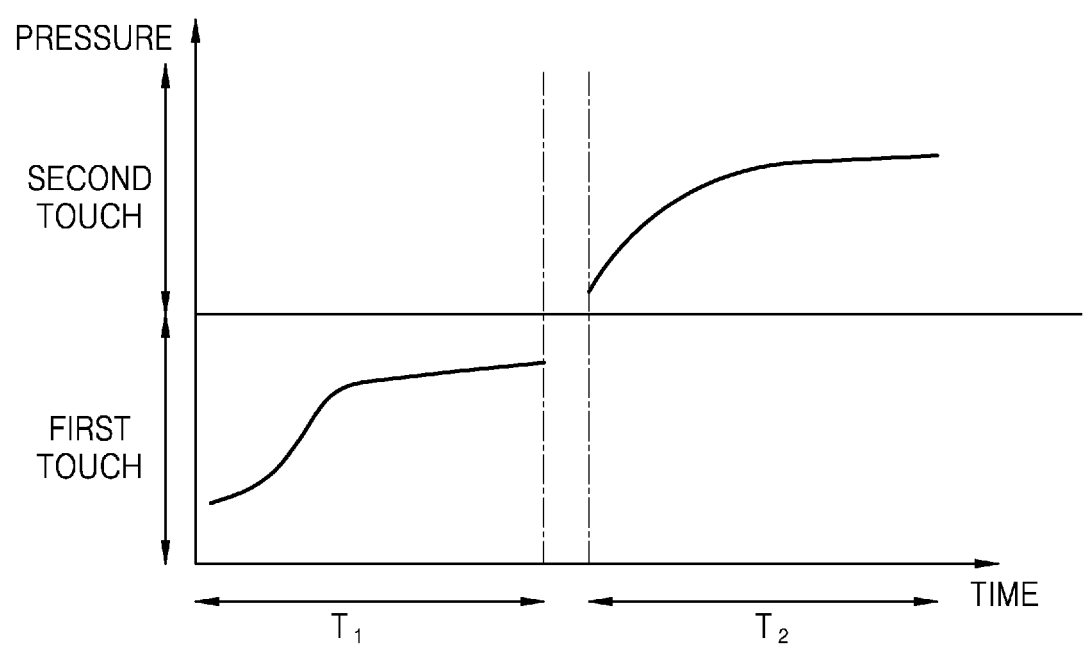
FIG. 6 is a diagram showing touch pressure applied to a display of an aerosol-generating device according to an embodiment.

FIG. 6 illustrates a graph showing touch pressures applied to the display 140 of the aerosol-generating device 100 according to an embodiment.

As an example, the user may touch a certain indicator 1400 with a pressure lower than or equal to a preset pressure during a time period T1, as shown in FIG. 6. In this case, the pressure sensor unit 144 may measure the user's touch pressure and classifies the users touch as a first touch because the measured pressure does not exceed the preset pressure. Accordingly, an operation signal corresponding to the first touch of the certain indicator 1400 may be transmitted to the processor 150.

The processor 150 that has received the operation signal linked to the first touch may perform an operation corresponding to the operation signal linked to the first touch described above. In this case, the preset pressure for classifying the user's touch may be set in advance to classify the user's touch.

As another example, the user may touch a certain indicator 1400 with a pressure than the preset pressure during a time period T2 shown in FIG. 6. In this case, the pressure sensor unit 144 may measure that the users touch pressure is greater than or equal to the preset pressure, thereby classifying the users touch as a second touch, and thereafter, an operation signal linked to the second touch of the certain indicator 1400 may be transmitted to the processor 150.

The processor 150 that has received an operation signal linked to the second touch of the certain indicator 1400 may be controlled to perform an operation corresponding to the operation signal linked to the second touch described above.

The operation signal linked to the first touch of the certain indicator 1400 and the operation signal linked to the second touch may be different from each other, and the operations of the aerosol-generating device 100 corresponding to the different operation signals may be performed differently.

Figure 7A:
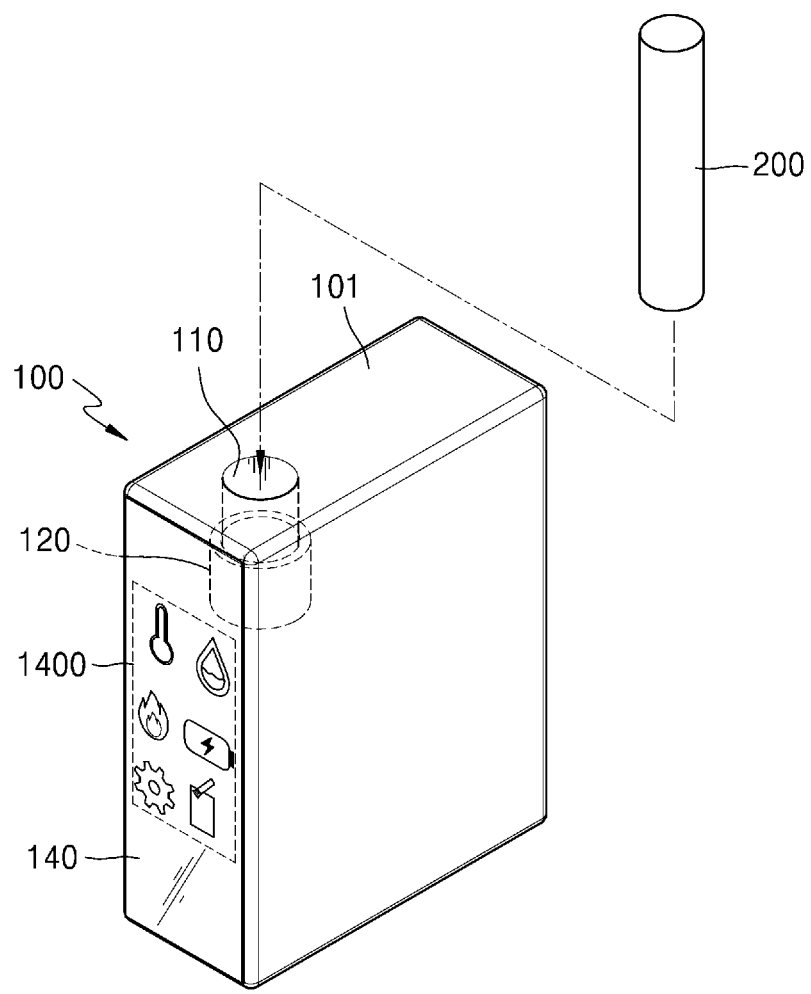
FIG. 7A is a perspective view of an aspect of an aerosol-generating device according to an embodiment and an aerosol-generating article.

FIG. 7A is a perspective view of the aerosol-generating device 100 according to an embodiment.

Referring to FIG. 7A, the display 140 of the aerosol-generating device 100 according to an embodiment may be arranged on one surface of the housing 101 such that the display 140 entirely covers one side surface of the housing 101.

The housing 101 of the aerosol-generating device 100 according to an embodiment may include first opposite side surfaces and second opposite side surfaces, the first opposite side surfaces each having a first surface area and the second opposite side surfaces each having a second surface area. The display 140 may be located on at least one of the first opposite side surfaces.

Side surfaces of the aerosol-generating device 100 according to an embodiment may be surfaces intersecting with a top surface in which an opening 111 is formed. The first opposite side surfaces may be a pair of side surfaces of the housing 101 which face opposite directions, and the second opposite side surfaces may be another pair of side surfaces of the housing 101 which face opposite directions.

The display 140 of the aerosol-generating device 100 according to an embodiment is located on at least one of the first opposite side surfaces, and in this case, the size of the first surface area of each of the first opposite side surfaces is smaller than the second surface area of each of the second opposite side surfaces. That is, as shown in FIG. 7A, the display 140 of the aerosol-generating device 100 may be a full-face display 140 entirely covering at least one of the first opposite side surfaces each having a smaller surface area than other side surfaces of the housing 101.

Figure 7B:
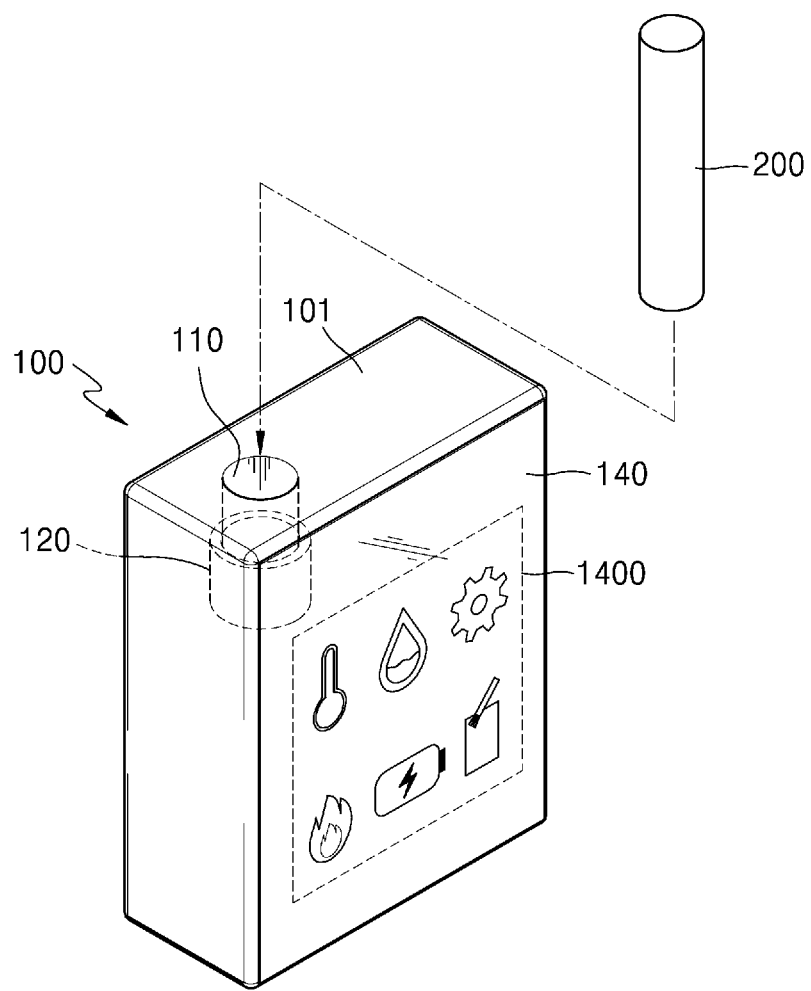
FIG. 7B is a perspective view of another aspect of an aerosol-generating device according to an embodiment and an aerosol-generating article.

FIG. 7B is a perspective view of the aerosol-generating device 100 according to another embodiment.

Referring to FIG. 7B, the display 140 may be located on at least one of the second opposite side surfaces. In this case, the size of the second surface area of each of the second opposite side surfaces may be larger than the first surface area of each of the first opposite side surfaces. That is, as shown in FIG. 7B, the display 140 of the aerosol-generating device 100 may be a full-face display 140 entirely covering at least one of the second opposite side surfaces each having a larger surface area than other side surfaces of the housing 101.

Figure 8A:
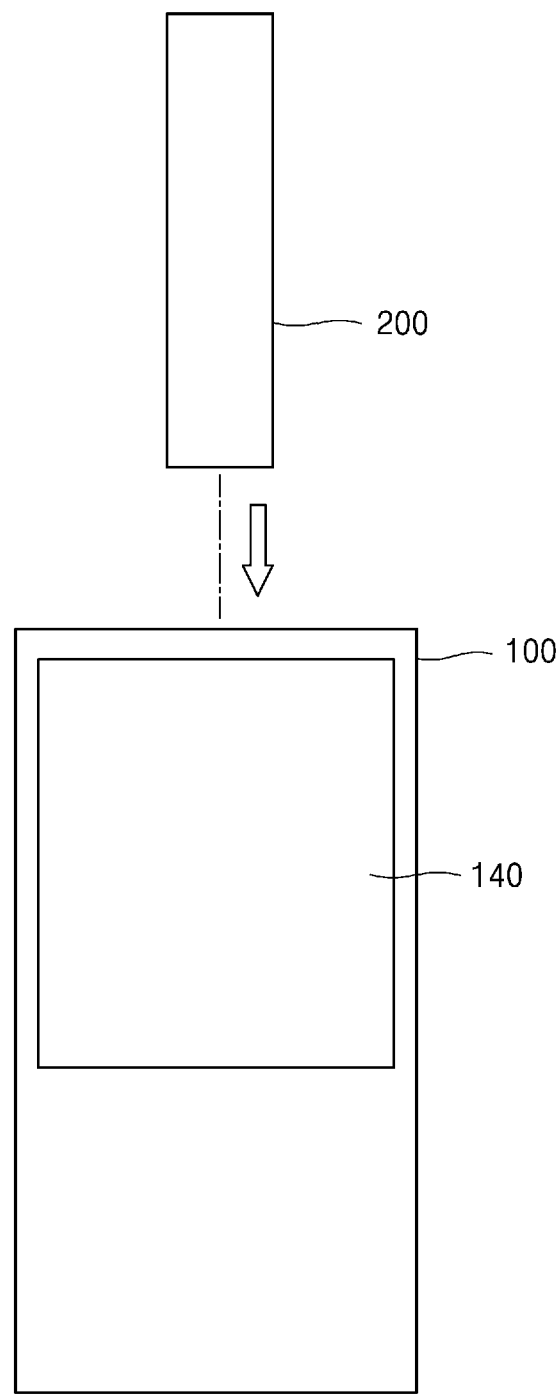
FIG. 8A is a front view of a display before an aerosol-generating article is inserted into an aerosol-generating device according to an embodiment.
Figure 8B:
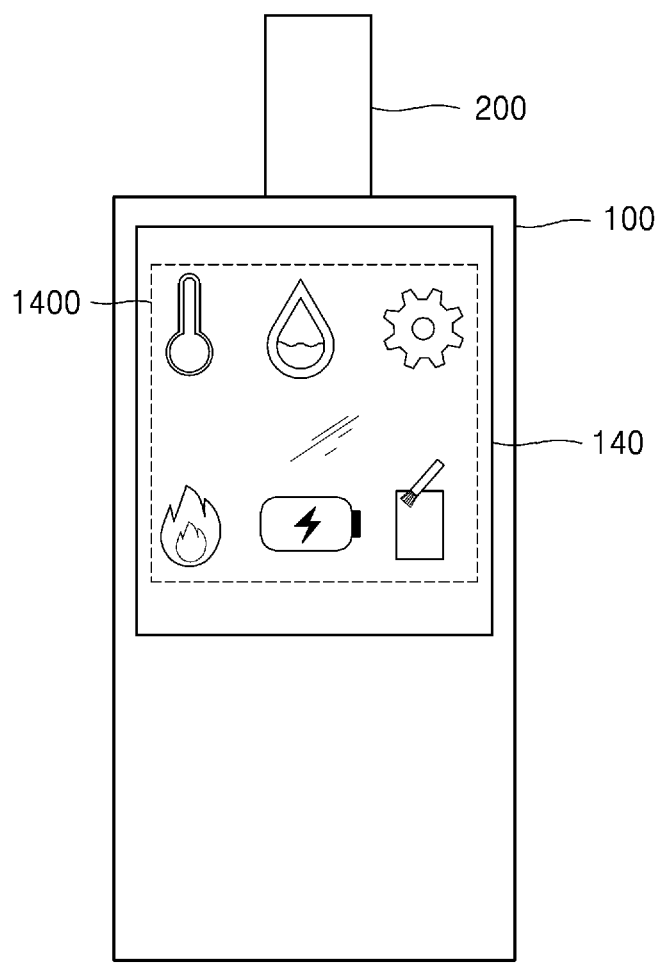
FIG. 8B is a front view of a display after an aerosol-generating article is inserted into an aerosol-generating device according to an embodiment.

FIG. 8A is a front view of a display before an aerosol-generating article is inserted into an aerosol-generating device according to an embodiment, and FIG. 8B is a front view of a display after an aerosol-generating article 200 is inserted into an aerosol-generating device 100 according to an embodiment.

The aerosol-generating device 100 according to an embodiment may include a sensor (not shown) that senses physical properties of the aerosol-generating article 200. The sensor may be, for example, an inductance sensor that detects a change in inductance in the accommodating portion 110 when the aerosol-generating article 200 is inserted into the aerosol-generating device 100.

The processor 150 may detect whether the aerosol-generating article 200 is accommodated in the accommodating portion 110 based on the physical properties of the aerosol-generating article 200 measured by the sensor. The processor 150 may change a state of the display 140 from an off-state to an on-state (i.e., turn on or activate the display 140) when the aerosol-generating article 200 is accommodated in the accommodating portion 110.

As shown in FIG. 8A, before the aerosol-generating article 200 is accommodated in the aerosol-generating device 100 according to an embodiment, the display 140 of the aerosol-generating device 100 may be in an off-state (i.e., the display 140 is turned off or in a sleep mode).

Thereafter, as shown in FIG. 8B, when the aerosol-generating article 200 is accommodated in the aerosol-generating device 100 according to an embodiment, the processor 150 of the aerosol-generating device 100 the processor 150 may detect the accommodation and change the state of the display 140 from the off-state to the on-state.

In the off-state, power is not supplied or slightly supplied to the display 140 and the display 140 does not output any indicator 1400. On the contrary, in the on-state, power is supplied to the display 140 such that the indicator 1400 is output on the display 140. The user may control the aerosol-generating device 100 by touching the at least one indicator 1400 output on the display 140 after the display 140 is changed to the on-state.

Figure 9:
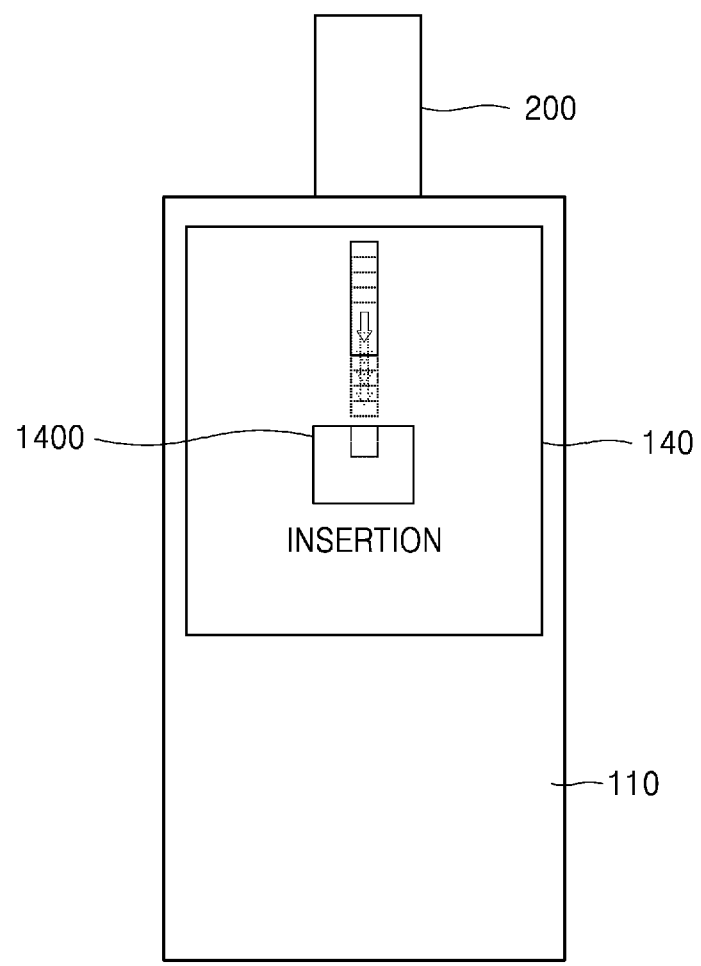
FIG. 9 is a diagram showing an example output of an indicator of an aerosol-generating device according to an embodiment.

FIG. 9 is a diagram showing an indicator output by an aerosol-generating device according to an embodiment.

The processor 150 of the aerosol-generating device 100 according to an embodiment may control the display 140 to output an indicator 1400 indicating the insertion of the aerosol-generating article 200 when the aerosol-generating article 200 is accommodated. In this case, the indicator 1400 may be a mark that allows the user to recognize the insertion of the aerosol-generating article 200, and is not limited to that shown in the drawings.

As described above, when the aerosol-generating article 200 is inserted into the aerosol-generating device 100, the processor 150 may change the state of the display 140 from an off-state to an on-state.

Then, as shown in FIG. 9, the display 140 of the aerosol-generating device 100 may inform the user of the event by outputting the indicator 1400 indicating the insertion of the aerosol-generating article 200.

Figure 10:
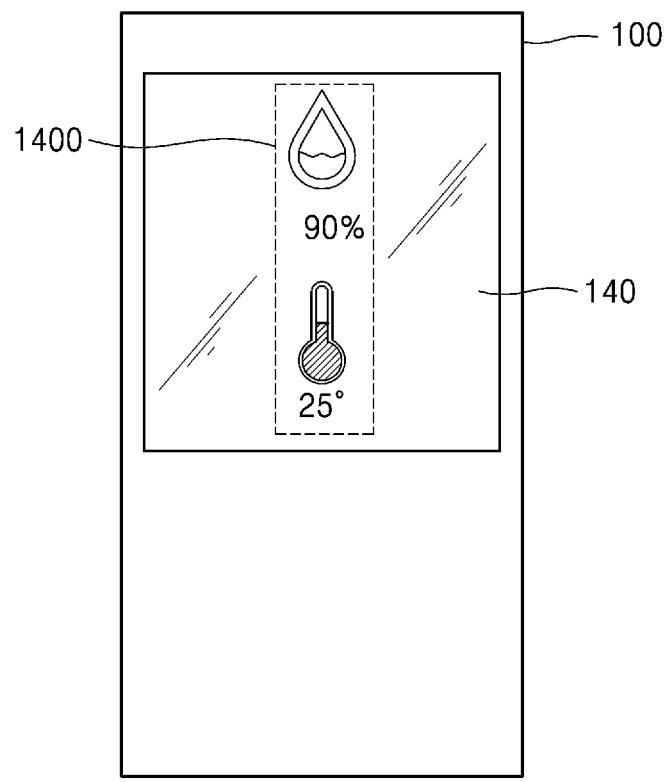
FIG. 10 is a diagram showing another example output of an indicator of an aerosol-generating device according to an embodiment.

FIG. 10 is a diagram showing an indicator 140X of the aerosol-generating device 100 according to another embodiment.

The display 140 of the aerosol-generating device 100 according to an embodiment may output the indicator 1400 linked to the temperature or humidity outside the aerosol-generating device 100. As shown in FIG. 10, after the temperature or humidity outside the aerosol-generating device 100 is measured, the display 140 of the aerosol-generating device 100 may inform the user of the temperature or humidity through the indicator 1400 linked to the temperature or humidity.

The aerosol-generating device 100 according to an embodiment may measure the temperature or humidity outside the aerosol-generating device 100, and use it as a reference factor for generating an optimal aerosol. For example, when the temperature outside the aerosol-generating device 100 is low, the aerosol-generating device 100 may raise the temperature of the heater above a general heating temperature. Accordingly, the aerosol-generating device 100 according to an embodiment may generate an aerosol of optimum quality.

Figure 11A:
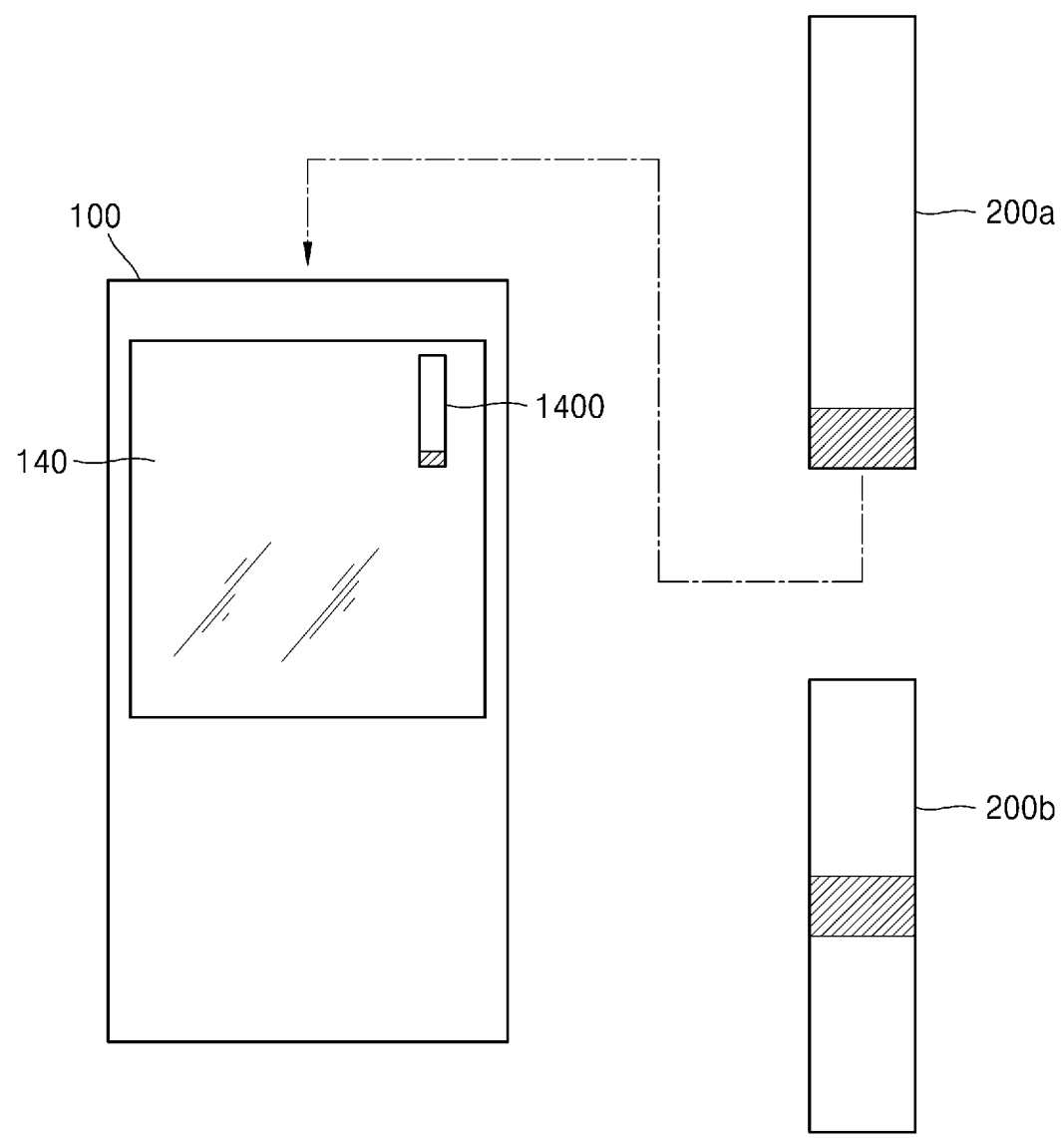
FIG. 11A is a diagram showing another example output of an indicator of an aerosol-generating device according to an embodiment.
Figure 11B:
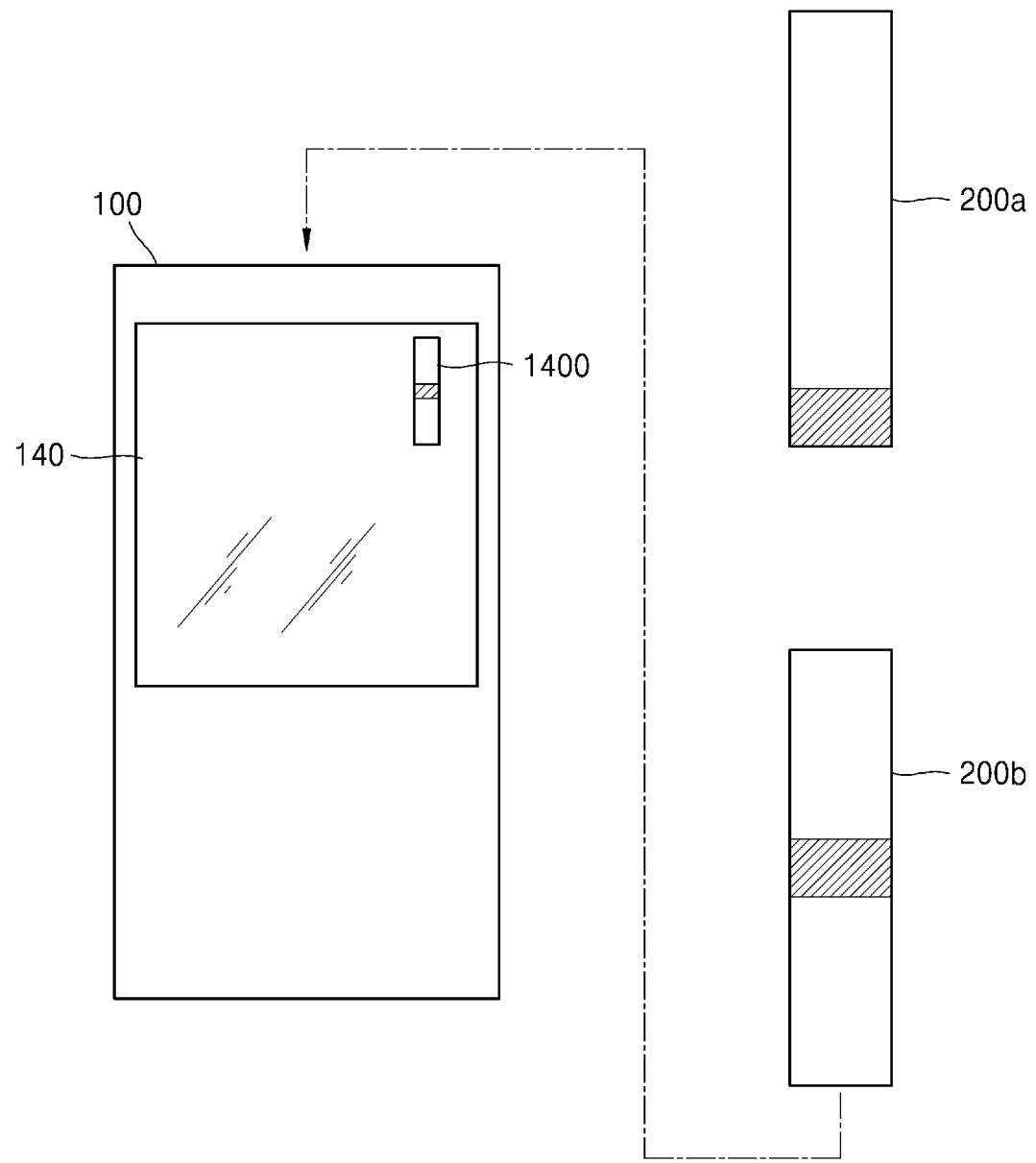
FIG. 11B is a diagram showing an example output of an indicator of an aerosol-generating device according to an embodiment.

FIGS. 11A and 11B show an indicator of an aerosol-generating device according to another embodiment.

The processor 150 of the aerosol-generating device 100 according to an embodiment may recognize the specifications of the aerosol-generating article 200 based on the physical properties of the aerosol-generating article 200 sensed by a sensor, and the processor 150 may control the display 140 to output an indicator 1400 indicating the recognized specifications of the aerosol-generating article 200.

The aerosol-generating device 100 according to an embodiment may include a sensor (not shown) that senses physical properties of the aerosol-generating article 200. The sensor may be arranged, for example, adjacent to the aerosol-generating article 200 inserted into the aerosol-generating device 100.

The sensor may be, for example, any one of an inductance sensor, a pressure sensor, a hardness measurement sensor (e.g., push-pull gauge), a resistance measurement sensor, an image sensor, and a capacitance measurement sensor, and may sense the corresponding physical properties of the aerosol-generating article 200.

Physical properties according to the specifications of the aerosol-generating article 200 may be previously stored in a memory unit (not shown) of the aerosol-generating device 100. The physical properties of the aerosol-generating article 200 measured through the sensor may be compared with the physical properties stored in the memory unit, and accordingly, the processor 150 may identify the specifications of the aerosol-generating article 200 based on the physical properties of the aerosol-generating article 200 measured by the sensor.

The processor 150 may control the display 140 to output the indicator 1400 indicating the recognized specifications of the aerosol-generating article 200.

Referring to FIG. 11A showing an example of the display 140 that recognizes the specifications of the aerosol-generating article 200 and displays the recognized specifications of the aerosol-generating article 200, among different aerosol-generating articles 200a and 200b, a first aerosol-generating article 200a may be inserted into the aerosol-generating device 100 according to an embodiment. In this case, the aerosol-generating device 100 may recognize specifications of the first aerosol-generating article 200a and output an indicator 1400 that displays the specifications of the first aerosol-generating article 200a.

Referring to FIG. 11B, among the different aerosol-generating articles 200a and 200b, a second aerosol-generating article 200b may be inserted into the aerosol-generating device 100 according to an embodiment. In this case, the aerosol-generating device 100 may recognize specifications of the second aerosol-generating article 200b and output an indicator 1400 that displays the specifications of the second aerosol-generating article 200b.

The indicator 1400 indicating the first aerosol-generating article 200a and the indicator 1400 indicating the second aerosol-generating article 200b may be different from each other. The indicator 1400 shown in FIG. 11A may include features corresponding to the aerosol-generating articles 200a and the indicator 1400 shown in FIG. 11B may include features corresponding to the aerosol-generating articles 200*b* so that a user may recognize the specifications of the aerosol-generating article inserted in the aerosol-generating device 100.

Figure 12:
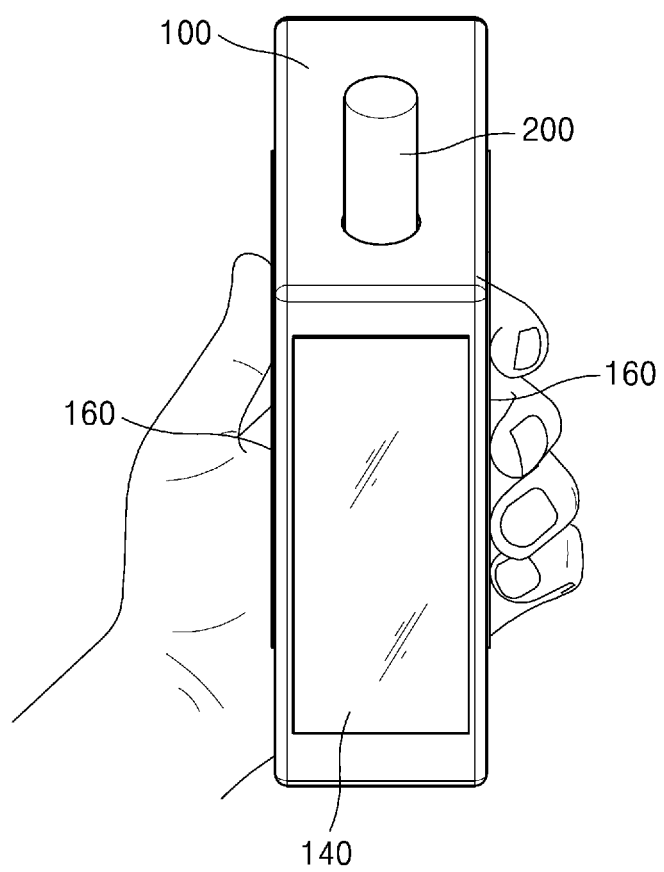
FIG. 12 is an example diagram of an aerosol-generating device that recognizes a user's grip according to an embodiment.

FIG. 12 illustrates an aerosol-generating device 100 that senses a user's grip, according to an embodiment.

The aerosol-generating device 100 according to the present embodiment may further include at least one force touch sensor 160 that detects the users grip and transmits an operation signal to the processor 150 when a user grips the aerosol-generating device 100. In this case, the force touch sensor 160 may be arranged on opposite side surfaces of the housing 101 of the aerosol-generating device 100.

The force touch sensor 160 may mean a sensor capable of acquiring information about the location and strength of pressure, and when a user grips the aerosol-generating device 100, the force touch sensor 160 of the aerosol-generating device 100 may detect a user's grip through the force touch sensor 160.

The force touch sensor 160 of the aerosol-generating device 100 may transmit an operation signal to the processor 150 on detecting the user's grip. The processor 150 may receive the operation signal and perform an operation corresponding to the operation signal.

For example, when the user's grip is detected, the force touch sensor 160 may transmit an operation signal to the processor 150 to change the state of the display 140 from an off-state to an on-state. Then, the processor 150 may receive the operation signal and change the state of the display 140 from an off-state to an on-state.

The force touch sensors 160 of the aerosol-generating device 100 may be arranged on opposite side surfaces of the housing 101 of the aerosol-generating device 100. That is, at least one pair of force touch sensors 160 may be included in the aerosol-generating device 100. Here, the side surfaces of the aerosol-generating device 100 may intersect with a top surface in which in which an opening 111 is formed. The opposite side surfaces may be a pair of side surfaces of the aerosol-generating device 100 which face opposite directions. As the force touch sensors 160 are respectively arranged on the opposite side surfaces, it is possible to accurately recognize the user's grip and reduce a recognition error rate.

As described above, the aerosol-generating device 100 according to an embodiment may include the display 140 that outputs at least one indicator 1400. As such, the user can intuitively grasp the information about the aerosol-generating device 100 through the indicator 1400 and can easily change the operation of the aerosol-generating device 100 based on the grasped information.

In addition, the display 140 of the aerosol-generating device 100 according to an embodiment may classify the user's touch input according to pressure. The aerosol-generating device 100 may also operate differently based on the touch input classified according to the pressure of the user's touch, thereby increasing the ease of use of the aerosol-generating device 100.

Those skilled in the art related to the present embodiments may understand that various changes in form and details can be made therein without departing from the scope of the characteristics described above. The disclosed methods should be considered in a descriptive sense only and not for purposes of limitation. The scope of the present disclosure is disclosed in the appended claims rather than disclosed in the above description, and all differences within the scope of equivalents thereof should be construed as being included in the present disclosure.

The invention claimed is:

1. An aerosol-generating device comprising:
a housing;
an accommodating portion configured to accommodate an aerosol-generating article through an opening formed on one side of the housing;
a sensor surrounding at least a portion of the accommodating portion and configured to sense physical properties of the aerosol-generating article;
a display arranged on one surface of the housing; and
a processor configured to:
detect whether the aerosol-generating article is accommodated in the accommodating portion based on the physical properties of the aerosol-generating article sensed by the sensor; and
activate the display when the aerosol-generating article is accommodated in the accommodating portion,
wherein the processor controls the display to output an indicator indicating a temperature or humidity outside the aerosol-generating device.

2. The aerosol-generating device of claim 1, wherein the processor controls the display to output an indicator indicating an insertion of the aerosol-generating article when the aerosol-generating article is accommodated in the accommodating portion.

3. The aerosol-generating device of claim 1, wherein the processor recognizes specifications of the aerosol-generating article based on the physical properties of the aerosol-generating article sensed by the sensor, and controls the display to output an indicator indicating the recognized specifications of the aerosol-generating article.

4. The aerosol-generating device of claim 1, wherein the display includes:
a cover glass;
a panel configured to output at least one indicator of the aerosol-generating device and detect user's touch on the cover glass; and
a metal shield including a feedback circuit configured to generate a feedback signal in response to the user's touch,
wherein the processor controls the aerosol-generating device to perform at least one of emitting light, outputting audio, vibrating, and outputting the at least one indicator on the display, according to the feedback signal,
wherein the metal shield includes at least one taptic motor configured to generate tactile feedback such that the aerosol-generating device vibrates according to the tactile feedback.

5. The aerosol-generating device of claim 4, wherein the display further includes a plurality of pressure sensors configured to measure intensity of the user's touch,
wherein the pressure sensors classify the user's touch according to the intensity of the user's touch, and the processor controls the aerosol-generating device to perform different operations according to the classified user's touch.

6. An aerosol-generating device comprising:
an accommodating portion configured to accommodate an aerosol-generating article through an opening formed on one side of a housing;
a heater configured to heat the aerosol-generating article by transferring heat to the accommodating portion;
a battery configured to supply power to the heater;
a display located on one surface of the housing and configured to output at least one indicator of the aerosol-generating device; and a processor controlling operations of the heater, the battery, and the display, wherein the display includes:
- a cover glass;
- a panel configured to output at least one indicator of the aerosol-generating device and detecting a user's touch on the cover glass; and
- a metal shield including a feedback circuit configured to generate a feedback signal in response to the user's touch, wherein the cover glass, the panel, and the metal shield are sequentially disposed and stacked toward the inner side of the housing.

7. The aerosol-generating device of claim 6, wherein
the display transmits an operation signal linked with the at least one indicator to the processor when the user's touch is detected on the at least one indicator, and the processor controls the aerosol-generating device to perform an operation corresponding to the operation signal.

8. The aerosol-generating device of claim 6, wherein the processor controls the aerosol-generating device to perform at least one of emitting light, outputting audio, vibrating, and outputting a certain indicator on the display, according to the feedback signal.

9. The aerosol-generating device of claim 6, wherein the metal shield includes at least one taptic motor configured to generate tactile feedback such that the aerosol-generating device vibrates according to the tactile feedback.

10. The aerosol-generating device of claim 6, wherein the display further includes a plurality of pressure sensors configured to measure intensity of the user's touch, wherein the pressure sensors classify the user's touch according to the intensity of the user's touch, and the processor controls the aerosol-generating device to perform different operations according to the classified user's touch.

11. The aerosol-generating device of claim 6, wherein the display is arranged to fully cover the one surface of the housing, wherein the housing includes first opposite side surfaces and second opposite side surfaces, and the display is located on at least one of the first opposite side surfaces, wherein each of the first opposite side surfaces is smaller than each of the second opposite side surfaces.

12. The aerosol-generating device of claim 6, further comprising at least one force touch sensor configured to detect a user's grip and transmit an operation signal to the processor when the user grips the aerosol-generating device.

13. The aerosol-generating device of claim 12, wherein the at least one force touch sensor includes a pair of force touch sensors arranged on opposite side surfaces of the housing, respectively.

14. An aerosol-generating device comprising:
- an accommodating portion configured to accommodate an aerosol-generating article through an opening formed on one side of a housing;
- a heater configured to heat the aerosol-generating article by transferring heat to the accommodating portion;
- a battery configured to supply power to the heater;
- a display located on one surface of the housing and configured to output at least one indicator of the aerosol-generating device; and
- a processor controlling operations of the heater, the battery, and the display, wherein the processor controls the display to output an indicator indicating a temperature or humidity outside the aerosol-generating device.

* * * * *